(12) United States Patent
Circenis et al.

(10) Patent No.: US 7,562,229 B2
(45) Date of Patent: Jul. 14, 2009

(54) CODEWORD-BASED AUDITING OF COMPUTER SYSTEMS AND METHODS THEREFOR

(75) Inventors: Edgar I. Circenis, Loveland, CO (US); Bradley A. Klein, Windsor, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 775 days.

(21) Appl. No.: 10/351,064

(22) Filed: Jan. 23, 2003

(65) Prior Publication Data

US 2004/0148511 A1    Jul. 29, 2004

(51) Int. Cl.
*H04L 9/32* (2006.01)

(52) U.S. Cl. .................... 713/187; 713/100; 713/150; 709/226; 380/30

(58) Field of Classification Search ............ 713/100, 713/150, 187; 709/226, 221; 705/59, 26, 705/56, 8, 58; 380/30
See application file for complete search history.

(56) References Cited

U.S. PATENT DOCUMENTS

| | | | | |
|---|---|---|---|---|
| 5,717,604 | A * | 2/1998 | Wiggins | 709/229 |
| 5,815,807 | A * | 9/1998 | Osmani et al. | 455/410 |
| 5,983,371 | A * | 11/1999 | Lord et al. | 714/55 |
| 6,009,177 | A * | 12/1999 | Sudia | 713/191 |
| 6,195,750 | B1 * | 2/2001 | Ellsworth | 713/100 |
| 6,366,950 | B1 * | 4/2002 | Scheussler et al. | 709/206 |
| 6,453,344 | B1 * | 9/2002 | Ellsworth et al. | 709/220 |
| 6,499,035 | B1 * | 12/2002 | Sobeski | 707/103 R |
| 6,910,082 | B1 * | 6/2005 | Marcotte | 709/246 |
| 2001/0011253 | A1 * | 8/2001 | Coley et al. | 705/59 |
| 2002/0032718 | A1 * | 3/2002 | Yates et al. | 709/107 |
| 2002/0120819 | A1 * | 8/2002 | Hickson | 711/152 |
| 2002/0138442 | A1 * | 9/2002 | Hori et al. | 705/59 |
| 2002/0161990 | A1 * | 10/2002 | Zhang et al. | 713/1 |

(Continued)

FOREIGN PATENT DOCUMENTS

DE    10007599    *    1/2001

(Continued)

OTHER PUBLICATIONS

Hewlett-Packard QuickSpecs, "HP Instant Capacity on Demand (iCOD) Solutions" downlaod from http://h18002.www1.hp.com/products/quickspecs/11723_div /11723_div.HTML, May 24, 2004.*

(Continued)

*Primary Examiner*—Tongoc Tran

(57) ABSTRACT

A computer-implemented method in a computer system for facilitating auditing of the computer system is disclosed. The method includes receiving a request for a codeword from a user of the computer system. The method further includes ascertaining first data from the computer system, the first data including at least one of a number of active components found in the computer system and a number of inactive components found in the computer system. The method additionally includes ascertaining second data from the computer system, the second data including identification data, the identification data identifying at least one of the computer system and a software program executing on the computer system. The method also includes forming the codeword using the first data and the second data, wherein the codeword includes the first data and the second data. Furthermore, the method includes providing the codeword to the user.

32 Claims, 3 Drawing Sheets

U.S. PATENT DOCUMENTS

| | | | | |
|---|---|---|---|---|
| 2003/0028786 | A1* | 2/2003 | Mustafa | 713/189 |
| 2003/0088516 | A1* | 5/2003 | Remer et al. | 705/59 |
| 2003/0135580 | A1* | 7/2003 | Camble et al. | 709/216 |
| 2004/0010581 | A1* | 1/2004 | Dodapati et al. | 709/224 |
| 2004/0148229 | A1* | 7/2004 | Maxwell | 705/26 |
| 2004/0148394 | A1* | 7/2004 | Circenis et al. | 709/226 |

FOREIGN PATENT DOCUMENTS

| | | | |
|---|---|---|---|
| GB | 2391975 | * | 2/2004 |

OTHER PUBLICATIONS

"HP Introduces Instant Capacity on Demand Solution Offering Australian E-Services Customers Immediate Additional Server Capacity", http://www.hp.com.au/PressRoom/PressRelease/1_1428_4147_00.html, 2002.*

UK search report mailed May 24, 2004 re App No. GB0400020.4.*

* cited by examiner

CODEWORD-BASED AUDITING OF COMPUTER SYSTEMS AND METHODS THEREFOR

This patent application relates to a commonly assigned patent application entitled "Methods And Apparatus For Managing The Execution Of A Task Among A Plurality Of Autonomous Processes," by inventors Edgar I. Circenis and Bradley A. Klein Ser. No. 10/351,071, a patent application entitled "Methods And Apparatus For Managing Temporary Capacity In A Computer System," by inventors Edgar I. Circenis and Bradley A. Klein Ser. No. 10/350,660, and a commonly assigned patent application entitled "Methods And Apparatus For Rapidly Activating Inactive Components In A Computer System," by inventors Edgar I. Circenis and Bradley A. Klein Ser. No. 10/351,128, all of which are filed on even date herewith and incorporated herein by reference.

BACKGROUND OF THE INVENTION

ICOD (Instant Capacity On Demand) systems are computer systems that typically include one or more inactive components (known as ICOD components) when shipped to the user. As the term is employed herein, an inactive or ICOD component is a software or hardware component or a set of hardware and/or software components that the user has not paid for and is not entitled to use as a matter of right.

Vendors include inactive or ICOD components in a computer system for many reasons. For example, a vendor may anticipate that a particular user may need additional software and/or hardware capability in the future and may wish to include the additional capability in an inactive form so that the additional capability can be quickly enabled at a later date if needed. The ICOD components may be processors, memory, cells, subsystems, or the like, and can be activated when the user wishes to obtain additional capability from the ICOD system.

Generally speaking, when an ICOD system is shipped to a user, either the vendor or the customer will deactivate the inactive components so that only the components that have been paid for will be active during use. This deactivation may happen one time prior to shipping, or the ICOD system may include software to automatically deactivate the ICOD components upon system booting based on the licensing data stored in the ICOD system itself.

Vendors of ICOD systems are generally concerned with, among many others, two issues: compliance to the ICOD licensing terms and responsiveness to technical support requests. Vendors are interested in ensuring that ICOD systems stay in compliance because if a user can utilize the additional capability without paying, there is no incentive to purchase the additional capability. Vendors are also interested in being responsive to technical assistance requests since such responsiveness improves customer service and customer loyalty, which can lead to increased sales volume over time.

With respect to compliance, some vendors rely on the user's honesty, preferring to depend on the user to voluntarily pay for the use of the inactive components when the user activates additional components in the ICOD system. Under the honor system, many users do indeed voluntarily report and pay when an inactive component is activated in order to legitimately acquire the use of the additional components. Other users, however, either through ignorance or by willful action, simply disregard the obligation to pay when activating a previously inactive component.

To ensure compliance, vendors in the past employ an ICOD software agent, e.g., codes in the ICOD system, to periodically take inventory of the inactive (or active) components and compare the number of inactive (or active) components with the licensing data stored in non-volatile memory. The data regarding the number of inactive (or active) components, along with other identification information such as the serial number of the computer system, the host name, the IP address, and the like may then be sent in an email to the vendor to allow the vendor to audit for compliance.

If a user's computer system has a greater number of active components therein than the number of active components allowed under license, the user's system is deemed to be in a non-compliant state, and the vendor may undertake any number of corrective actions. For example, the vendor may wish to send a sales representative to the user whose system is found to be in a non-compliant state in order to suggest the licensing of the activated components. As another example, the vendor may notify the user of the non-compliant status and request that the buyer either immediately pay for the use of the inactive components, or to cease the non-compliant use.

However, it has been found that many users are reluctant to endow their production computer systems with an email infrastructure, and to risk exposing the computer system to the security risks that accompany email access. For some users, even the exposure of the host name to the outside world is unacceptable. For these users, it is not possible to implement an email-based auditing program.

As one alternative, a vendor may send out a human field service representative to the user's site to conduct a personal audit of the user's ICOD computer system. To prevent dishonest users from cheating by placing an otherwise out-of-compliance ICOD system in compliance only temporarily in order to satisfy the personal audit by the vendor, some vendors require their users to agree to surprise personal audits. However, many users resent the unannounced intrusion by a stranger in their facilities, and the unplanned disruption that a surprise personal audit may entail. Even if the users acquiesce to surprise personal audits, this approach is still quite costly for the vendor due to the cost of hiring field service personnel, travel time and expenses, and the like.

With respect to technical support, vendors are aware that poor technical support leads to dissatisfied customers. Generally speaking, vendors with a good reputation for technical support enjoy customer loyalty and a higher sales volume, all other things being equal. In order to provide good technical support for a given user, a vendor must first have a clear understanding of the technical problems faced by that given customer. For some very simple problems, the vendor may be able to assess the technical problem from the verbal or written description provided by the user. Since computer problems may be quite complex to diagnose, and since users are often inexperienced in accurately describing technical problems, many vendors end up resorting to field service calls to timely resolve technical problems for their customers. However, as mentioned earlier, field service calls are expensive and even though a vendor may sometimes be able to pass the field service call cost onto his customer, vendors are constantly searching for a less costly way to provide technical support for their customers.

Some computer systems are connected to the Internet or another public network, and a vendor may be able to diagnose certain technical problems remotely by accessing the user's computer system via appropriate networking technologies. As mentioned earlier, however, many customers are reluctant to provide their production computer systems with Internet connectivity and/or an email facility. For these customers, the use of field service personnel may be the only choice to resolve their technical problems.

SUMMARY OF THE INVENTION

The invention relates, in one embodiment, to a computer-implemented method in a computer system for facilitating auditing of the computer system. The method includes receiving a request for a codeword from a user of the computer system. The method further includes ascertaining first data from the computer system, the first data including at least one of a number of active components found in the computer system and a number of inactive components found in the computer system. The method additionally includes ascertaining second data from the computer system, the second data including identification data, the identification data identifying at least one of the computer system and a software program executing on the computer system. The method also includes forming the codeword using the first data and the second data, wherein the codeword includes the first data and the second data. Furthermore, the method includes providing the codeword to the user.

In another embodiment, the invention relates to a computer-implemented method in a first computer system for facilitating auditing of a second computer system. The method includes receiving a codeword from a user of the second computer system, the codeword being furnished by the user after the user obtains the codeword from the second computer system, the codeword containing information pertaining to a plurality of parameters associated with the second computer system. The method further includes ascertaining first data from the codeword, the first data representing identification data identifying at least one of the second computer system and a software program executing on the second computer system. The method further includes comparing the first data against another copy of the identification data associated with the second computer system, the another copy of the identification data being obtained independently of the codeword. Furthermore, the method includes generating, if the first data is different from the another copy of the identification data, an error message for transmission to the user.

In yet another embodiment, the invention relates to an article of manufacture comprising a program storage medium having computer readable codes embodied therein, the computer readable code being configured for facilitating auditing of a computer system. The article of manufacture includes computer readable codes for receiving a request for a codeword from a user of the computer system. The article of manufacture additionally includes computer readable codes for ascertaining first data from the computer system, the first data including at least one of a number of active components found in the computer system and a number of inactive components found in the computer system. The article of manufacture further includes computer readable codes for ascertaining second data from the computer system, the second data including identification data, the identification data identifying at least one of the computer system and a software program executing on the computer system. The article of manufacture also includes computer readable codes for forming the codeword using the first data and the second data, wherein the codeword includes the first data and the second data; and. The article of manufacture additionally includes computer readable codes for providing the codeword to the user.

These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENTS

Figure 1:
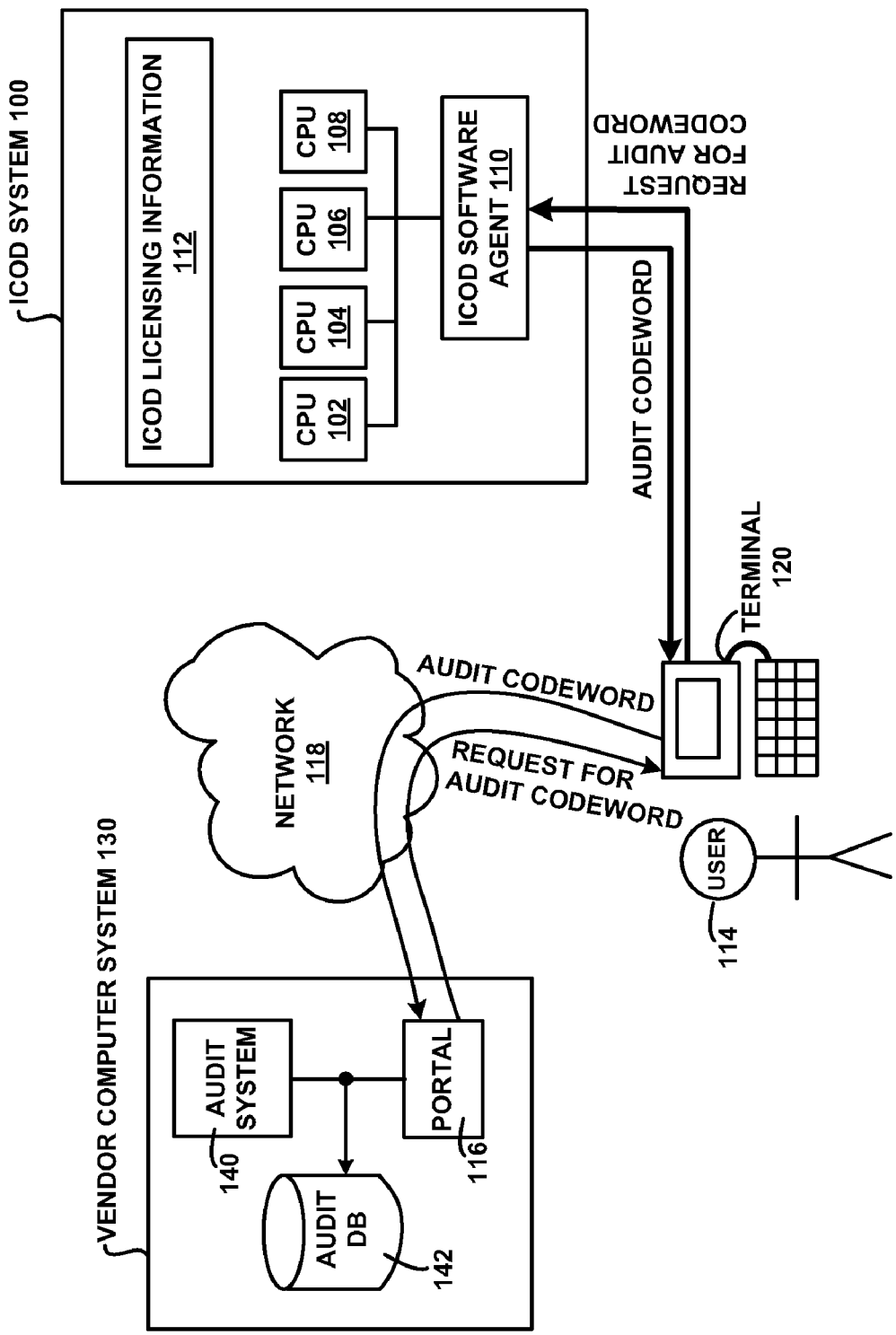
FIG. 1 shows, in accordance with one embodiment of the present invention, a simplified exemplary computer system containing four CPUs, some of which may represent ICOD CPU components.

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

In accordance with one embodiment of the present invention, there are provided methods and apparatus for permitting a vendor to audit a customer's computer system remotely without requiring the existence of an email infrastructure and/or internet connectivity on the customer's computer system. In one embodiment, auditing is facilitated through the use of a codeword, which the vendor requests from the user. The user's computer system includes codes for generating the codeword, which the user can obtain by entering a command at the user's computer system.

The audit codeword itself is preferably in a format that the user can enter, using either a keyboard or a using a cut-and-paste method, into a message to be sent to the vendor. In a preferred embodiment, the audit codeword is transmitted upon the vendor's request by the user to the vendor's internet portal via the internet and a browser on the user's terminal. The audit codeword includes status and historical information about the user's computer system, which information allows the vendor to ascertain whether the user's computer system complies with the terms of the ICOD contract. The audit codeword also includes information to assist the vendor to diagnose technical problems with the user's computer system.

Techniques to minimize fraud and to ensure accuracy with the audit codeword and/or the codeword-based auditing procedure are also disclosed herein. In general, the audit codeword may be requested by the vendor as part of a technical support session, or periodically as part of an ICOD compliance program. Additionally or alternatively, the vendor may request the audit codeword whenever the user contacts the vendor for support, query, or any other issues dealing with the user's computer system. As disclosed in the aforementioned co-pending patent applications, these customer service interactions may include requests by the user to replenish temporary capacity, to allow certain components to be turned on temporarily for a limited time, and the like.

Advantageously, the inventive codeword-based auditing techniques renders it possible for the vendor to obtain compliance information and/or information regarding technical problems with the user's computer system without having to rely on the user's honesty or the user's technical description, the accuracy of which is often suspect. Furthermore, the auditing is accomplished without exposing the user's computer system to the risks associated with email access and/or internet connectivity.

These and other features and advantages of the present invention may be better understood with reference to the drawings and figures that follow. FIG. 1 shows, in accordance with one embodiment of the present invention, a simplified exemplary ICOD system 100 having four CPUs 102, 104, 106, and 108 (although any number of CPUs are possible). In the example of FIG. 1, CPUs 102 and 104 represent licensed CPUs, i.e., CPUs that the user has already paid for and is entitled to use as a matter of right under the acquired right. CPUs 106 and 108 represent ICOD CPUs, which are normally deactivated in ICOD system 100.

There is provided an ICOD software agent 110, representing the software codes executing in ICOD system 100 for periodically taking an inventory of the number of active (or inactive) components on ICOD system 100, comparing the number of active (or inactive) components with the number of components allowed to be active per the ICOD licensing information 112. ICOD software agent 110 may then store data regarding any problem or non-compliance states for reporting.

ICOD licensing information 112 is generally kept in non-volatile memory (such as nonvolatile semiconductor memory in ICOD system 100 or in a file on disk) and may include information such as the identification data regarding ICOD system 100, the number of components existing on ICOD system 100, the number of components that are allowed to be active (or should be kept in active) based on the ICOD contract between the vendor and the user, and the like. ICOD licensing information 112 may also include data regarding the temporary capacity availability as well as any other pending right entitlement that the user of ICOD system 100 may have. Temporary capacity and pending right to enable the rapid activation of ICOD components are aspects discussed in the aforementioned co-pending patent applications.

To facilitate auditing (for technical support and/or ICOD licensing compliance), the vendor requests from user 114 an audit codeword. The term "vendor" is employed generically herein to denote the entity responsible for supporting the user and is not necessarily limited to (although the term may include) the manufacturer of the computer system, the distributor, the dealer, the contract servicing organization, or any other entity responsible for auditing the user's computer system and/or providing technical support to the user.

Generally speaking, a vendor may specify in an agreement with the user that the vendor is entitled to receive an audit codeword upon request or the vendor may simply require the audit codeword as part of a technical support session. Furthermore, user 114 may occasionally need to interact with the vendor in order to, for example, purchase additional temporary capacity, obtain temporary right to activate components, to report a technical problem and request technical support, and the like. As part of the interaction session, the vendor may request that the user furnish the audit codeword before the user's request can be fulfilled.

In the embodiment of FIG. 1, the interaction between user 114 and the vendor takes place via a portal 116, which is accessible to user 114 via network 118 and a browser on the user's terminal 120. Upon receiving the request for the audit codeword, user 114 in turn interacts with ICOD software agent 110 to issue a request to ICOD software agent 110 for the audit codeword.

In response to user 114's request for the audit codeword, ICOD software agent 110 compiles an audit codeword based on the current state data and/or historical data pertaining to ICOD computer system 100. The audit codeword itself actually represents a report, in an encoded and/or encrypted form, of the status of various current and historical parameters associated with ICOD computer system 100.

By way of example, the audit codeword may include information regarding the ICOD licensing information 112 to allow the vendor to ascertain whether the ICOD licensing information stored on ICOD computer system 100 is accurate. Further, the audit codeword may include the number and types of components existing on ICOD computer system 100, the number of active (or inactive) components by type, the current value of the temporary capacity balance, the compliance history of ICOD system 100 over some period of time, and the like. Details regarding one implementation of the audit codeword are discussed in details in FIG. 2 herein.

The audit codeword is preferably furnished from ICOD software agent 110 to user 114 in a format that user 114 can in turn furnish to vendor compute system 130 without undue difficulty. For example, the audit codeword may be encrypted and encoded into ASCII characters, which the user can then type or cut-and-paste into a message or a webpage to be transmitted to vendor computer system 130. As another example, the user may print out the audit codeword and fax the audit codeword to the vendor to be entered into vendor computer system 130 by an employee of the vendor. In general, the audit codeword may be communicated by any telecommunication or communication means (including, for example, first class mail if there is no urgency).

The vendor's computer system includes, in addition to the aforementioned portal 116, an audit system 140 and an audit database 142. Audit system 140 includes codes for performing the analysis of the audit codeword to audit for compliance or to analyze the audit codeword to ascertain the states of various parameters in ICOD computer system 100 for technical support purposes. Audit database 142 may include, for example, the vendor's records of the ICOD licensing information for the ICOD computer system. Audit database 142 may also include historical data regarding any temporary capacity and/or temporary right granted, the compliance history of ICOD system 100 based on past audits, historical audit data, and the like. The information in audit database 142 and in the audit codeword facilitates compliance auditing and/or technical assessment of the states of parameters in ICOD computer system 100 by audit system 140.

Note that in the example of FIG. 1, ICOD computer system 100 has only one operating system and one set of CPUs, thereby simplifying the task of periodically obtaining compliance data on ICOD computer system 100. When the ICOD computer system is implemented as a partitionable computer system, there may be multiple ICOD software agents executing autonomously on various partitions of the partitionable ICOD computer system. Techniques for ensuring that compliance reports are sent only once for each rotation of the periodic inventory cycle when there are multiple autonomously executing ICOD software agents present are discussed in the aforementioned co-pending patent application entitled "Methods And Apparatus For Managing The Execution Of A Task Among A Plurality Of Autonomous Processes."

Figure 2:
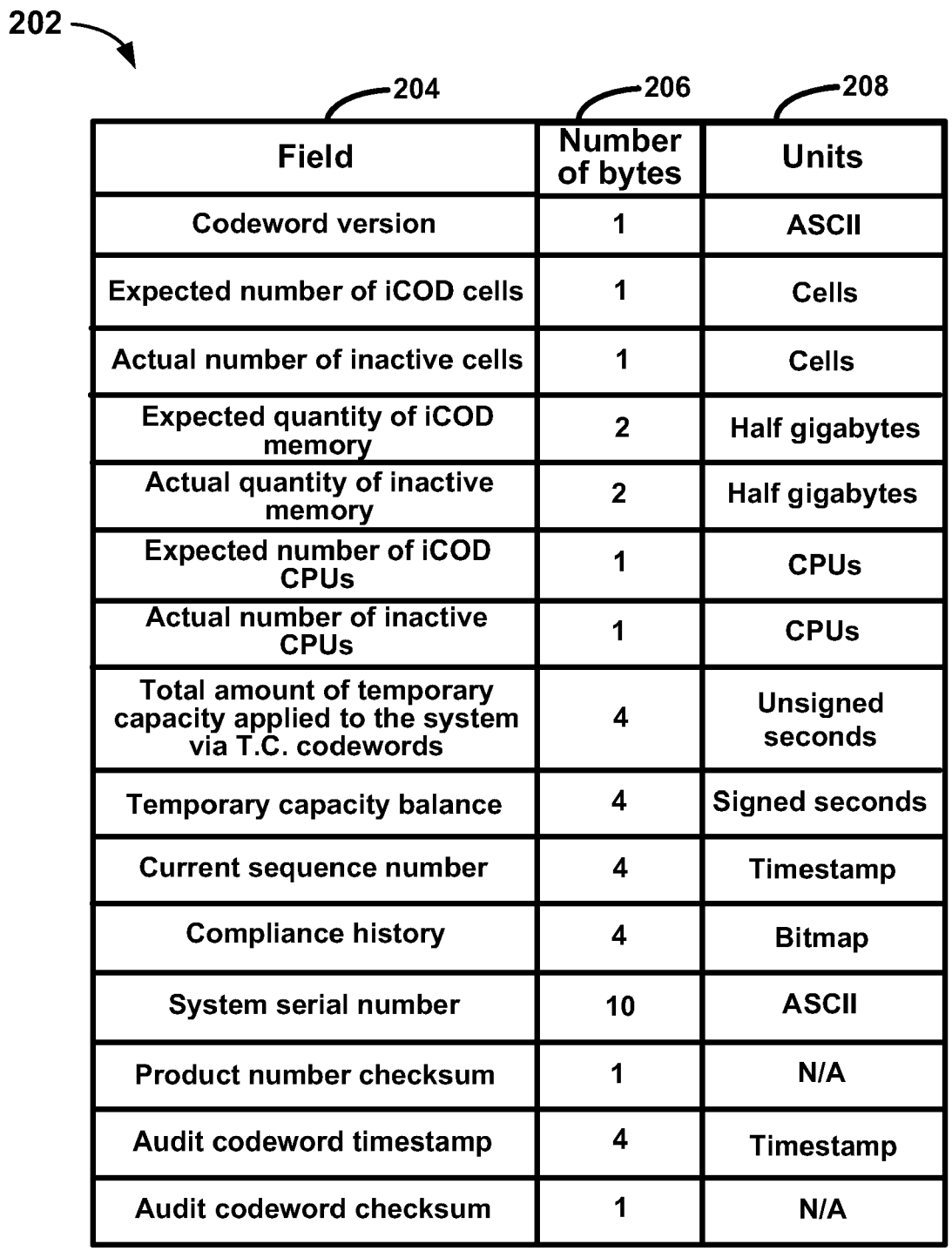
FIG. 2 shows, in accordance with one embodiment of the present invention, an exemplary audit codeword.

FIG. 2 shows, in accordance with one embodiment of the present invention, an exemplary audit codeword 202. As shown in FIG. 2, there are associated with each field of the exemplary audit codeword a field name (204), a number of bytes (206), and units (208). The codeword version field is included to help the auditing system ascertain the formatting of the audit codeword since different versions may have different formats. The codeword version may be represented by, for example, an ASCII string.

The expected number of ICOD cells represents the number of cells expected to be inactive on the user's computer system. The actual number of inactive cells represents the number of cells found to be inactive on the computer system at the time the audit codeword is formed. As the term is employed herein, a cell is subsystem that may include one or more processors and memory and may serve as a building block for larger systems.

Likewise, the expected quantity of ICOD memory represents the quantity of memory (in half gigabytes units in the example of FIG. 2) expected to be inactive on the user's computer system. The actual quantity of inactive memory represents the quantity of memory found to be inactive on the computer system at the time the audit codeword is formed. The expected number of ICOD CPUs represents the number of CPUs expected to be inactive on the user's computer system. The actual number of inactive CPUs represents the number of CPUs found to be inactive on the computer system at the time the audit codeword is formed.

The total amount of temporary capacity applied to the system via T.C. codewords represents the cumulative amount of temporary capacity that has been applied to the user's computer system via temporary capacity codewords. This field can be used to determine if all issued temporary capacity codewords have been applied to the user's computer system. The temporary capacity balance field represents the amount of temporary capacity found remaining in the user's computer system at the time the audit codeword is formed.

The current sequence number field represents a sequence number kept in the user's computer system to prevent the fraudulent reuse of a temporary capacity codeword and/or a pending right codeword. In the example of FIG. 2, a codeword is deemed valid only if its own sequence number is greater than the value of the current sequence number field stored in the user's computer system. The current sequence number field is updated every time a valid codeword is applied to the user's computer system.

In the example of FIG. 2, the codeword timestamp of the last successfully applied codeword is employed as the current sequence number. However, the current sequence number may well represent an integer value that is incremented every time a codeword is applied to the user's computer system. The inclusion of the current sequence number in the audit codeword facilitates troubleshooting in case the user has a problem applying a temporary capacity codeword, for example.

The compliance history field is an N-bit field (32 bits in the example of FIG. 2) that reflects the historical compliance data for the user's computer system. Periodically, an ICOD software agent inventories the active and/or inactive components in the user's computer system and ascertains whether the system is in compliance. The historical compliance data may then be stored in an N-bit bitmap for inclusion in the audit codeword when the audit codeword is generated.

Each bit of the N-bit bitmap represents a compliance data vector that reflects whether the user's system is in compliance during a particular rotation of the periodic schedule. For example, suppose that the ICOD software agent takes an inventory of the user's computer system every 24 hours. With 32 bits of data, 32 days worth of history can be recorded, with each bit representing the compliance status each time the inventory process is executed. A value of 1 can represent the non-compliant status, and a value of 0 can represent the compliant status, for example.

By representing the historical compliance data with an N-bit bitmap, the number of bits that needs to be transmitted in the audit codeword to represent the historical compliance data is advantageously kept low. Furthermore, non-compliance can be easily detected by summing the bits in the N-bit bitmap. If the sum of the bits is greater than zero, there has been at least one instance of non-complying use during the time period that the historical compliance data is kept. Further, the use of the compliance history field prevents a user from temporarily placing his computer system into compliance (by inactivating ICOD components, for example), generating an audit codeword to satisfy the vendor, and continue to use the computer system in a non-compliant manner.

The system serial number and product number checksum represent a way to uniquely identify the user's computer system or the software which needs to be audited. These pieces of data may be obtained by the ICOD software agent using system calls, for example. Although the system serial number and the product number checksum are employed to uniquely identify the user's computer system and/or the software to be audited thereon, any other unique identification data may well be employed.

It should be noted at this point that the inventive codeword-based auditing techniques disclosed herein can be used to audit hardware and/or software components, subsystems, or products. Furthermore, even if there are no inactive components (software and/or hardware) provided, codeword-based auditing is still valuable since the audit codeword can provide accurate information, both current and historical, pertaining to the user's software and/or hardware. The information furnished may be used for technical support purposes, for example.

The audit codeword timestamp furnishes information regarding the time the audit codeword is generated. This value can be employed to determine whether an audit codeword is recently generated, and to prevent a dishonest user from being able to use an old audit codeword to hide recent non-compliant activities on the user's computer system. This value is also checked to ensure that the audit codeword reflects recent state information about the user's computer system, which is important fact to establish in the technical support context.

The audit codeword checksum is a checksum value of the audit codeword, and may be used to detect data corruption during audit codeword formation/transmission and/or audit codeword tampering.

The information furnished in various fields may also be compared against other pieces of data furnished by the user. For example, the vendor may ask the user for the identification data (e.g., system serial number and/or product number) at the same time that the user furnishes the audit codeword. The identification data entered is then compared against the identification data encoded in the audit codeword to ensure that a dishonest user did not attempt to furnish an audit codeword from a compliant computer system to hide non-compliant activities on a different computer system.

As mentioned, the audit codeword is preferably encoded in a format that the user can transmit to the vendor without undue difficulty. In one embodiment, ASCII encoding is employed. The audit codeword may also be encrypted prior to encoding (using, for example, public key encryption).

Figure 3:
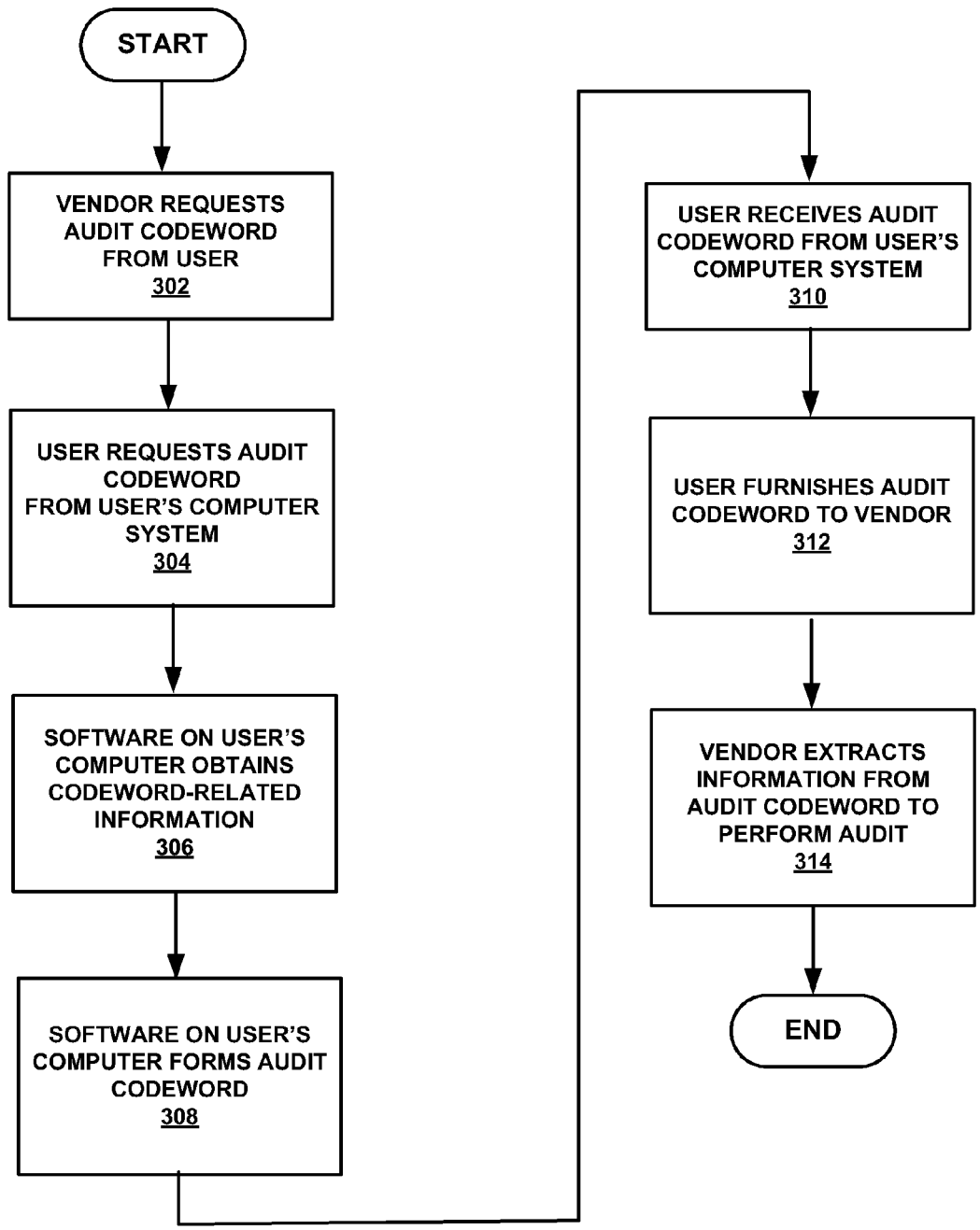
FIG. 3 shows, in accordance with one embodiment of the present invention, the steps for codeword-based auditing.

FIG. 3 shows, in accordance with one embodiment of the present invention, the steps for codeword-based auditing. In step 302, the vendor requests the audit codeword from the user. The vendor may request the audit codeword periodically per previous arrangement with the user or the vendor may request the audit codeword prior to fulfilling a request by the user. The user may have contacted the vendor's portal, for example, to request a codeword to add additional capacity, to have a temporary right to activate certain components, to request technical support, to inquire information about the user's computer system, or the like.

In step 304, the user executes a command on the user's computer system to request the audit codeword.

In step 306, software on the user's computer obtains certain information from the user's computer system (such as the number of inactive/active components, the identification data pertaining to the user's computer hardware/software, the current temporary capacity balance, and the like) to form the audit codeword.

In step 308, the audit codeword is created from the information obtained from the user's computer system and optionally from historical data stored in the user's computer system.

In step 310, the audit codeword is furnished to the user, which the user can then furnish to the vendor (step 312). As mentioned earlier, the user can furnish the audit codeword to the vendor by typing into a browser or cutting-and-pasting the audit codeword into a browser for transmission to the vendor's portal.

In step 314, the vendor's auditing system receives the audit codeword and extracts data therefrom to perform its auditing task.

As can be appreciated from the foregoing, the inventive codeword-based auditing techniques disclosed herein advantageously allow the vendor to perform remote auditing of the user's computer system without requiring the existence of an email infrastructure and/or internet connectivity on the customer's computer system. By using an audit codeword generated by software on the user's computer system, auditing can be performed in a substantially less costly manner than is possible with field service visits.

Since the status and historical data pertaining to the user's computer system is automatically generated by software within the user's computer system, and since the user's involvement is limited to requesting the audit codeword from the user's computer system and forwarding the audit codeword in its entirety to the vendor, auditing accuracy is enhanced while minimizing the need for a high degree of technical sophistication on the part of the user. The provision of fraud-prevention data fields in the audit codeword (such as the system identification data, the time stamp field, the historical compliance data, the audit codeword checksum, and the like) and other fraud prevention techniques (such as encryption and/or encoding and/or comparing the codeword data with data from another source) minimize the opportunity for dishonesty, further ensuring that the vendor obtain an accurate reading of status and historical data pertaining to the user's computer system.

While this invention has been described in terms of several preferred embodiments, there are alterations, permutations, and equivalents which fall within the scope of this invention. For example, although the example herein employs CPUs as exemplary ICOD components, the invention also applies to any type of software and/or hardware ICOD component. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. In a computer system, a computer-implemented method for facilitating auditing of said computer system, comprising:
   receiving a request for a codeword from a user of said computer system;
   ascertaining first data from said computer system, said first data including at least one of a number of active components found in said computer system and a number of inactive components found in said computer system;
   ascertaining second data from said computer system, said second data including identification data, said identification data identifying at least one of said computer system and a software program executing on said computer system;
   forming said codeword using said first data and said second data, wherein said codeword includes said first data and said second data;
   providing said codeword to said user; and
   ascertaining third data from said computer system, said third data including historical compliance data for said computer system, said historical compliance data including a plurality of compliance data vectors collected over multiple rotations of a periodic inventory schedule, each of said compliance data vectors having one of a first state and a second state, said first state representing a state wherein said computer system is in compliance with a predefined set of parameters during a rotation of said periodic inventory schedule, said second state representing a state wherein said computer system is out of compliance with said predefined set of parameters during said rotation of said periodic inventory schedule; and
   utilizing said third data in said forming said codeword, wherein said codeword also includes said third data.

2. The method of claim 1 further comprising:
   ascertaining third data from said computer system, said third data including current time information; and
   utilizing said third data in said forming said codeword, wherein said codeword also includes said third data.

3. The method of claim 1 wherein said forming further includes encrypting said first data and said second data.

4. The method of claim 3 wherein said encrypting employs a public key encryption technique.

5. The method of claim 3 wherein said forming further includes encoding said first data and said second data.

6. The method of claim 5 wherein said encoding represents ASCII encoding.

7. The method of claim 1 wherein said forming includes encoding said first data and said second data.

8. The method of claim 1 further comprising:
   ascertaining third data from said computer system, said third data including temporary capacity data for said computer system; and
   utilizing said third data in said forming said codeword, wherein said codeword also includes said third data.

9. The method of claim 1 wherein said plurality of compliance data vectors are represented in said codeword as a bit pattern, a value of each bit in said bit pattern is set to a first value if said computer system is in said first state, said value of said each bit in said bit pattern is set to a second value if said computer system is in said second state, a location of a given bit in said bit pattern indicating a specific rotation of said periodic inventory schedule during which compliance information associated with said given bit is collected.

10. The method of claim 1 wherein said first data pertains to CPUs.

11. The method of claim 1 wherein said first data pertains to quantities of memory.

12. The method of claim 1 wherein said first data pertains to cells.

13. The method of claim 1 wherein said first data pertains to software components.

14. In a first computer system, a computer-implemented method for facilitating auditing of a second computer system, comprising:
- receiving a codeword from a user of said second computer system, said codeword being furnished by said user after said user obtains said codeword from said second computer system, said codeword containing information pertaining to a plurality of parameters associated with said second computer system;
- ascertaining first data from said codeword, said first data representing identification data identifying at least one of said second computer system and a software program executing on said second computer system;
- comparing said first data against another copy of said identification data associated with said second computer system, said another copy of said identification data being obtained independently of said codeword;
- if said first data is different from said another copy of said identification data, generating an error message for transmission to said user;
- ascertaining second data from said codeword, said second data including at least one of a number of active components found in said second computer system and a number of inactive components found in said second computer system;
- comparing said second data with a respective one of expected active components data and expected inactive components data, said expected active components data representing a number of components expected to be active in said second computer system, said expected inactive components data representing a number of components expected to be inactive in said second computer system;
- if said comparing compares said number of active components found in said second computer system with said expected active component data, designating said second computer system out of compliance if said number of active components found in said computer system is greater than said expected active component data; and
- if said comparing compares said number of inactive components found in said second computer system with said expected inactive component data, designating said second computer system out of compliance if said number of inactive components found in said second computer system is less than said expected inactive component data; and
- ascertaining a historical compliance data from said codeword, said historical compliance data including a plurality of compliance data vectors collected from said second computer system over multiple rotations of a periodic inventory schedule, each of said compliance data vectors having one of a first state and a second state, said first state representing a state wherein said second computer system is in compliance with a predefined set of parameters during a rotation of said periodic inventory schedule, said second state representing a state wherein said second computer system is out of compliance with said predefined set of parameters during said rotation of said periodic inventory schedule.

15. The method of claim 14 further comprising:
- ascertaining second data from said codeword, said second data including at least one of a number of active components found in said second computer system and a number of inactive components found in said second computer system;
- comparing said second data with a respective one of expected active components data and expected inactive components data, said expected active components data representing a number of components expected to be active in said second computer system, said expected inactive components data representing a number of components expected to be inactive in said second computer system; and
- if said number of active components found in said second computer system exceeds said number of components expected to be active in said computer system, performing steps (a)-(c) below:
  - (a) ascertaining a temporary capacity availability from said codeword,
  - (b) determining whether said temporary availability is adequate to support an excess number of active components, said excess number of active components representing the difference between said number of active components found in said second computer system and said number of components expected to be active in said computer system, and
  - (c) designating said second computer system out of compliance if said temporary availability is inadequate to support said excess number of active components.

16. The method of claim 15 wherein said second data pertains to CPUs.

17. The method of claim 14 wherein said second data pertains to CPUs.

18. The method of claim 14 wherein said plurality of compliance data vectors are represented in said codeword as a bit pattern, a value of each bit in said bit pattern is set to a first value if said second computer system is in said first state, said value of said each bit in said bit pattern is set to a second value if said second computer system is in said second state, a location of a given bit in said bit pattern indicating a specific rotation of said periodic inventory schedule during which compliance information associated with said given bit is collected.

19. The method of claim 14 wherein said second data pertains to quantities of memory.

20. The method of claim 14 wherein said second data pertains to cells.

21. The method of claim 14 wherein said second data pertains to software components.

22. The method of claim 14 further comprising decrypting said codeword.

23. The method of claim 14 wherein said user furnishes said codeword using the Internet.

24. The method of claim 23 wherein said codeword is received at a portal accessible to said first computer system.

25. An article of manufacture comprising a program storage medium having computer readable codes embodied therein, said computer readable code being configured for facilitating auditing of a computer system, comprising:
- computer readable codes for receiving a request for a codeword from a user of said computer system;
- computer readable codes for ascertaining first data from said computer system, said first data including at least one of a number of active components found in said computer system and a number of inactive components found in said computer system;
- computer readable codes for ascertaining second data from said computer system, said second data including identification data, said identification data identifying at least one of said computer system and a software program executing on said computer system;
- computer readable codes for forming said codeword using said first data and said second data, wherein said codeword includes said first data and said second data;

computer readable codes for providing said codeword to said user;

computer readable codes for ascertaining third data from said computer system, said third data including historical compliance data for said computer system, said historical compliance data including a plurality of compliance data vectors collected over multiple rotations of a periodic inventory schedule, each of said compliance data vectors having one of a first state and a second state, said first state representing a state wherein said computer system is in compliance with a predefined set of parameters during a rotation of said periodic inventory schedule, said second state representing a state wherein said computer system is out of compliance with said predefined set of parameters during said rotation of said periodic inventory schedule; and computer readable codes for utilizing said third data in said forming said codeword, wherein said codeword also includes said third data.

26. The article of manufacture of claim 25 further comprising:

computer readable codes for ascertaining third data from said computer system, said third data including current time information; and computer readable codes for utilizing said third data in said forming said codeword, wherein said codeword also includes said third data.

27. The article of manufacture of claim 25 further including computer readable codes for encrypting said first data and said second data.

28. The article of manufacture of claim 25 wherein said plurality of compliance data vectors are represented in said codeword as a bit pattern, a value of each bit in said bit pattern is set to a first value if said computer system is in said first state, said value of said each bit in said bit pattern is set to a second value if said computer system is in said second state, a location of a given bit in said bit pattern indicating a specific rotation of said periodic inventory schedule during which compliance information associated with said given bit is collected.

29. The article of manufacture of claim 25 wherein first second data pertains to CPUs.

30. The article of manufacture of claim 25 wherein said first data pertains to quantities of memory.

31. The article of manufacture of claim 25 wherein said first data pertains to cells.

32. The article of manufacture of claim 25 wherein said first data pertains to software components.

* * * * *